(12) United States Patent
Tenorio

(10) Patent No.: US 7,225,146 B2
(45) Date of Patent: May 29, 2007

(54) METHOD, SYSTEM AND ARTICLE OF MANUFACTURING FOR DYNAMIC DATABASE REDIRECTION USING SEMANTIC TAXONOMY INFORMATION

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 836 days.

(21) Appl. No.: 10/032,945

(22) Filed: Sep. 27, 2001

(65) Prior Publication Data

US 2003/0061060 A1 Mar. 27, 2003

Related U.S. Application Data

(60) Provisional application No. 60/326,060, filed on Sep. 27, 2001.

(51) Int. Cl.
*G06Q 30/00* (2006.01)
*G06F 17/30* (2006.01)
*G07F 7/00* (2006.01)

(52) U.S. Cl. ............................. 705/26; 705/27
(58) Field of Classification Search .................. 705/1, 705/26, 27, 37
See application file for complete search history.

(56) References Cited

U.S. PATENT DOCUMENTS

| 5,132,900 A | 7/1992 | Gilchrist et al. ............ 364/419 |
| 5,379,340 A | 1/1995 | Overend et al. ............ 379/93 |
| 5,675,791 A | 10/1997 | Bhide et al. ............ 395/621 |
| 5,758,328 A * | 5/1998 | Giovannoli ............ 705/26 |
| 5,812,995 A | 9/1998 | Sasaki et al. ............ 707/1 |
| 5,920,873 A | 7/1999 | Van Huben et al. ......... 707/202 |
| 5,987,506 A | 11/1999 | Carter et al. ............ 709/213 |

(Continued)

FOREIGN PATENT DOCUMENTS

EP 000697669 * 2/1996

(Continued)

OTHER PUBLICATIONS

Website http://e-docs.bea.com/wics/docs32/catalog/intro.htm, "Introduction to the Product Catalog".*

(Continued)

*Primary Examiner*—Jeffrey A. Smith
*Assistant Examiner*—Mila Airapetian
(74) *Attorney, Agent, or Firm*—Steven J. Laureanti; James E. Walton

(57) ABSTRACT

An electronic commerce system includes one or more seller databases that store product data for one or more products. The system further includes a seller selection interface operable to receive seller requirements from a user and generate one or more custom global content directories based on the seller requirements. The custom global content directories include a plurality of product classes organized in a hierarchy with the product classes categorizing a number of products from sellers satisfying the seller requirements and associated with attributes of the products categorized in the product class. At least one of the product classes has associated pointers that identify the one or more of the seller databases. The system further includes a search interface that communicates a search query to the seller databases for product data.

32 Claims, 5 Drawing Sheets

U.S. PATENT DOCUMENTS

| | | | | |
|---|---|---|---|---|
| 6,014,644 | A | * | 1/2000 | Erickson .................. 705/37 |
| 6,035,297 | A | | 3/2000 | Van Huben et al. ............ 707/8 |
| 6,088,693 | A | | 7/2000 | Van Huben et al. ............ 707/8 |
| 6,088,717 | A | | 7/2000 | Reed et al. ................ 709/201 |
| 6,092,121 | A | | 7/2000 | Bennett et al. ............ 709/250 |
| 6,094,654 | A | | 7/2000 | Van Huben et al. ............ 707/8 |
| 6,226,675 | B1 | | 5/2001 | Meltzer et al. ............. 709/223 |
| 6,253,188 | B1 | | 6/2001 | Witek et al. ................ 705/14 |
| 6,269,361 | B1 | | 7/2001 | Davis et al. ................. 707/3 |
| 6,275,933 | B1 | | 8/2001 | Fine et al. .................. 713/2 |
| 6,397,231 | B1 | | 5/2002 | Salisbury et al. ........... 707/515 |
| 6,442,574 | B1 | | 8/2002 | Schumacher et al. ....... 707/501 |
| 6,473,791 | B1 | | 10/2002 | Al-Chosein et al. ........ 709/217 |
| 6,484,143 | B1 | | 11/2002 | Swildens et al. .............. 705/1 |
| 6,484,149 | B1 | * | 11/2002 | Jammes et al. ............. 705/26 |
| 6,560,620 | B1 | | 5/2003 | Ching ...................... 707/511 |
| 6,778,991 | B2 | | 8/2004 | Tenorio ..................... 707/10 |
| 2001/0020240 | A1 | | 9/2001 | Classen .................... 707/104 |
| 2001/0049675 | A1 | | 12/2001 | Mandler et al. .............. 707/1 |
| 2002/0013827 | A1 | | 1/2002 | Edstrom et al. ............ 709/219 |
| 2002/0019778 | A1 | * | 2/2002 | Isaacson et al. ............ 705/26 |
| 2002/0095301 | A1 | | 7/2002 | Villena ....................... 705/1 |
| 2002/0111870 | A1 | * | 8/2002 | Chinnappan et al. ........ 705/26 |
| 2002/0147656 | A1 | | 10/2002 | Tam et al. .................. 705/26 |
| 2003/0050958 | A1 | | 3/2003 | Keller et al. ............... 709/201 |
| 2005/0154652 | A1 | * | 7/2005 | Bezos et al. ................ 705/27 |
| 2005/0197907 | A1 | * | 9/2005 | Weiss ........................ 705/22 |
| 2005/0261983 | A1 | * | 11/2005 | Etten et al. ................. 705/26 |

FOREIGN PATENT DOCUMENTS

| | | | |
|---|---|---|---|
| EP | 1 056 024 A1 | | 11/2000 |
| EP | 001256887 | * | 5/2001 |
| JP | 04352068 A | | 12/1992 |
| WO | WO 95/26534 | * | 10/1995 |
| WO | WO 0016210 | * | 3/2000 |
| WO | WO01/61433 A2 | | 8/2001 |

OTHER PUBLICATIONS

Carey, et al. "Load Balancing in a Locally Distributed Database System," © 1986 *ACM* 0-89791-191-1/86/0500/0108 (pp. 108-119).

"Oracle® e-Commerce Gateway" User's Guide, Release 11/.2, Aug. 2000, Part No. A75089-02.

* cited by examiner

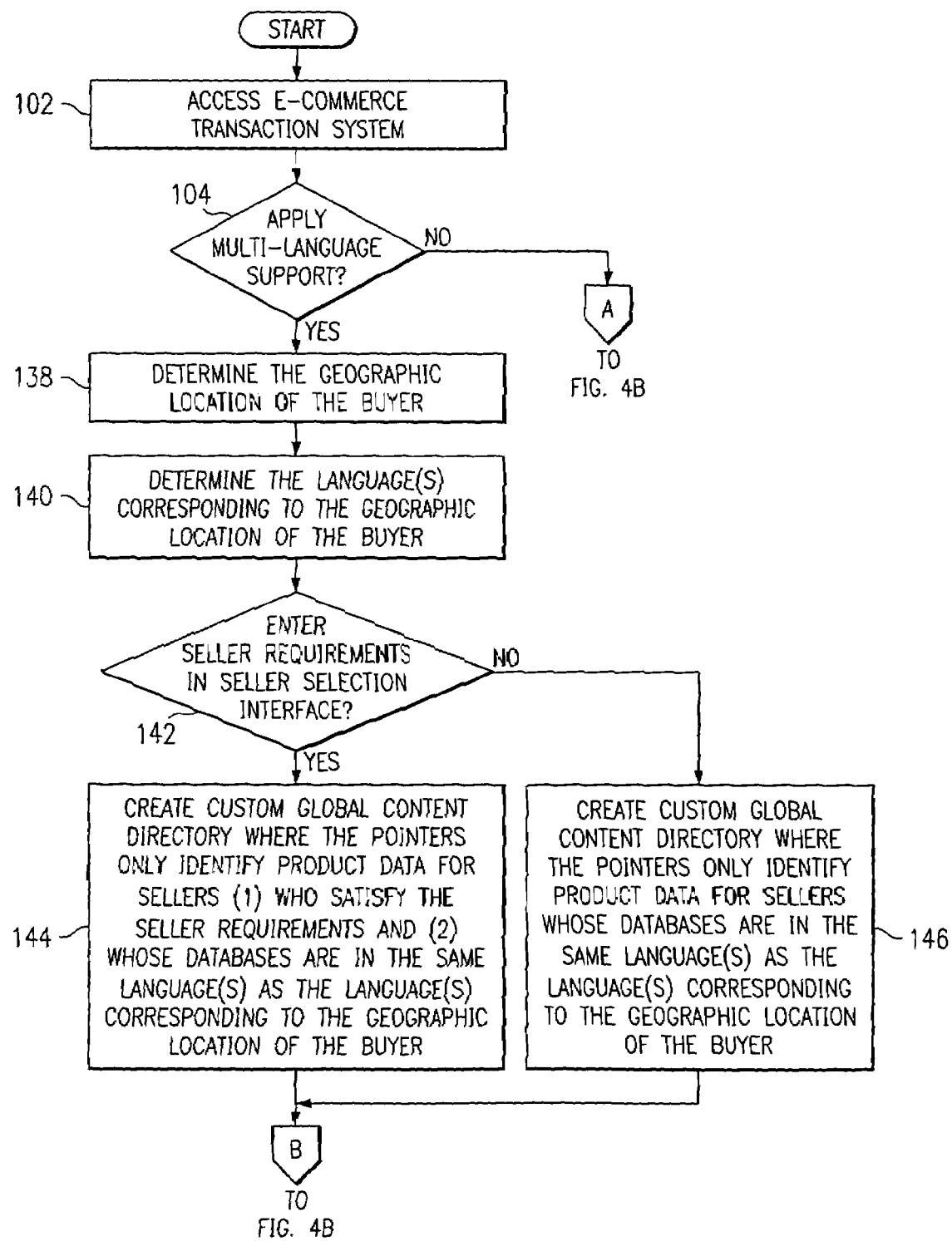

METHOD, SYSTEM AND ARTICLE OF MANUFACTURING FOR DYNAMIC DATABASE REDIRECTION USING SEMANTIC TAXONOMY INFORMATION

RELATED APPLICATIONS

This patent application claims priority to U.S. provisional patent application U.S. Ser. No. 60/326,060, filed on Sep. 27, 2001, and entitled DYNAMIC DATABASE REDIRECTION USING SEMANTIC TAXONOMY INFORMATION.

TECHNICAL FIELD OF THE INVENTION

This invention relates to electronic commerce and more particularly to dynamic database redirection using semantic taxonomy information.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. Often times buyers may have established relationships with particular sellers, have specific seller requirements for the sellers with whom the buyers interact, or require products or sellers compatible with particular languages or regions of the world. If the buyer does not have an established relationship with a seller or if the buyer is purchasing the product for the first time, the buyer will often perform two searches—a search for a number of sellers that offer the product and then a search of those sellers to determine which sellers meet the seller requirements of the buyer. Once the buyer has located the sellers that offer the product and satisfy the seller requirements, the buyer will access the sellers' web sites to determine which seller offers certain desired product features at the best price and under the best terms for the buyer. The matching phase of e-commerce transactions (matching the buyer with a particular seller that satisfies all of the buyer's requirements) is often inefficient because of the multiple searches and large amount of searching involved in finding a product and a seller that both satisfy the requirements of the buyer.

SUMMARY OF THE INVENTION

According to the present invention, disadvantages and problems associated with previous e-commerce techniques have been substantially reduced or eliminated.

In one embodiment of the present invention, an electronic commerce system includes one or more seller databases that include product data for one or more products. The system further includes a seller selection interface where a buyer enters one or more seller requirements for sellers selling particular products. The system also includes one or more global content directories that include a plurality of product classes organized in a hierarchy. Each product class categorizes a number of products from the one or more sellers satisfying the seller requirements. In addition, each product class is associated with one or more attributes of the products categorized in the product class. At least one of the product classes has one or more associated pointers that identify one or more of the seller databases. The system further includes a search interface that communicates a search query to the seller database for product data from sellers satisfying the seller requirements.

Particular embodiments of the present invention may provide one or more technical advantages. For example, certain embodiments of the present invention provide a seller selection interface that may be used by a number of buyers to enter seller requirements and/or product requirements before the buyers begin searching for products. When the seller requirements are used to search for products, the search is more efficient and searching time is reduced because the buyer only searches for products from sellers that satisfy the seller requirements. Searching time is reduced because the seller databases are only searched for products satisfying the seller requirements instead of entering search criteria for products and sellers and then searching all the product data in the seller databases for sellers and products that satisfy the search criteria. Therefore, efficient and quick searching result since the buyers eliminate sellers not satisfying the data requirements at the beginning of eliminating the review of search results. In addition, searching for product data may be further expedited through the use of multi-language support where the seller selection interface determines the geographic location of the buyer, determines the languages that correspond to the geographic location of the buyer, and only searches seller databases that are in the languages corresponding the geographic location of the buyer.

Furthermore, particular embodiments of the present invention also allow for the creation of custom product catalogs when particular buyers and sellers have previous transaction relationships. Specific buyers and sellers may have agreements between them where a seller may offer special packages or prices to buyers that the seller has dealt with previously or buyers who buy a large quantity of products. But sellers will want to control access to the custom product catalogs and only allow those buyers who are privy to the special arrangement to have the ability to access the custom catalog. In the seller selection interface, buyers may enter the seller requirements needed to access the custom catalog for sellers with whom the buyers have a transaction relationship. This allows sellers to keep their product data in a centralized and controlled location and still offer custom catalogs to particular buyers. Other technical advantages may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
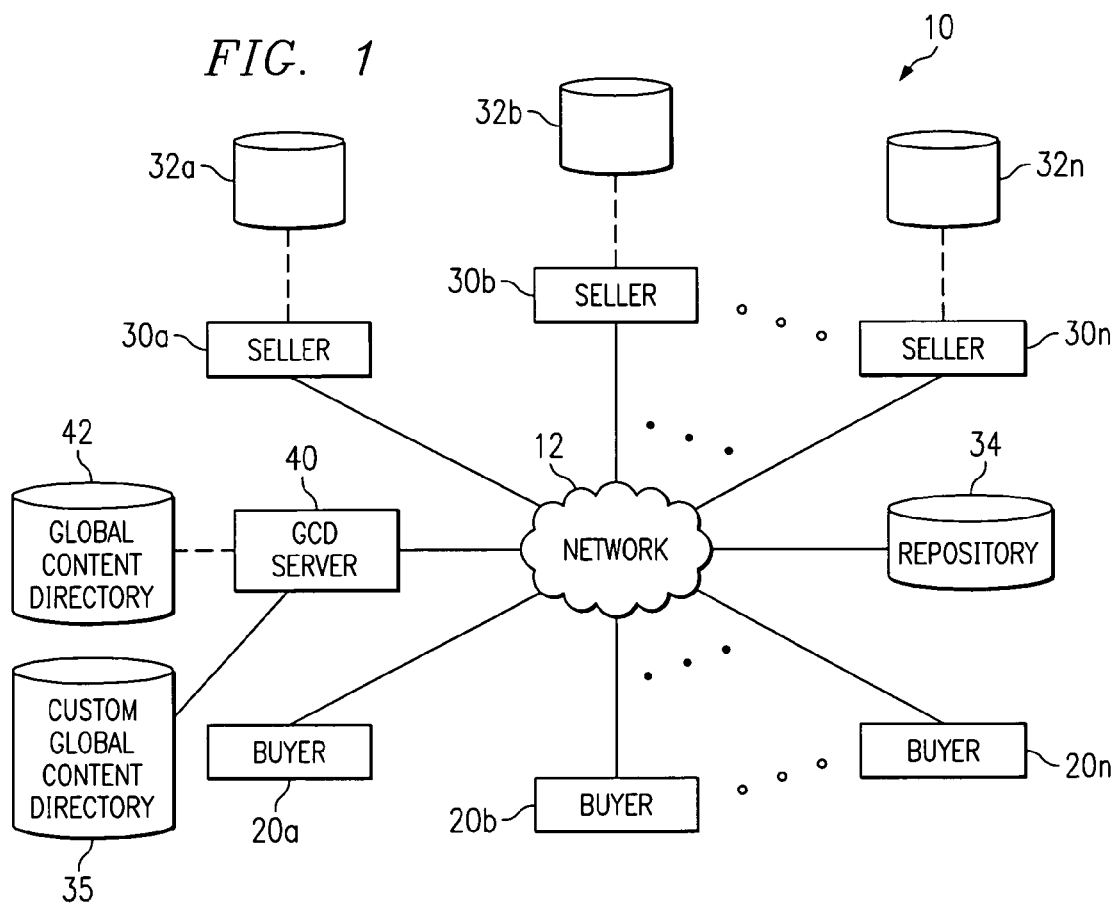
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32. Shared data repository 34 may include commonly used data that may be used by multiple sellers 30 (for example, common data such as manufacturer product descriptions may be combined with more specific seller data, such as product pricing data).

But even with GCD 42 facilitating the matching phase of an e-commerce transaction, buyers 20 may still spend too much time searching for the desired products from sellers 30 that buyers 20 find acceptable. Buyers 20 may have very specific requirements for what they seek in both the products that they buy and the sellers 30 that they deal with. For example, buyer 20*a* may be located in Europe and may be interested in sellers 30 that sell products that operate on the 220 volts, 50 Hertz standard while buyer 20*b* may purchase products for the United States and Canada markets and therefore only be interested in sellers 30 that sell products that operate on the 110 volts, 60 Hertz standard. Buyers 20 also may differ on what languages they prefer or require the data in seller databases 32 to be in. Buyer 20 navigates through GCD 42 searching for the desired products and once buyer 20 locates the desired products, buyer 20 initiates a search for the products including additional product requirements and seller requirements. Searching for products often takes more time than desired by buyer 20 because although buyer 20 generally has to perform one search when using GCD 42, buyer 20 typically may search all seller databases 32 associated with a particular class and limit the search with product search criteria and/or seller search criteria.

In addition to buyers 20 having specific product and seller requirements, sellers 30 also need a way to create custom catalogs for buyers 20 with whom sellers 30 have a previous transaction relationship, including special purchase agreements between buyers 20 and sellers 30. For example, buyer 20*b* may have a transaction history of buying all their pens from seller 20*b*. Because of this previous transaction relationship, seller 30*b* may desire to offer special deals or discounts to buyer 20*b* to continue to receive the business of buyer 20*b*. But seller 30*b* does not want to offer these specials to other buyers 20 with whom seller 30*b* does not have a transaction relationship and therefore needs a way to do this. In addition to previous transaction relationship, seller 30*b* and buyer 20*a* may decide to enter into an agreement whereby buyer 20*a* agrees to buy a minimum quantity of products from seller 30*b* in exchange for seller 30*b* offering discounted prices to buyer 20*a*. Just as with buyer 20*b*, seller 30*b* would like to make these special discounts and products available to buyer 20*a* without making the specials available to any other buyers 20. Sellers 30 may create custom catalogs for any other appropriate reasons. The time and cost required to create a custom catalog for buyer 20*b* and a private catalog for buyer 20*a* as well as creating other custom and/or private catalogs for other buyers 20 that seller 30*b* has transactions relationships with often outweighs the benefit seen by seller 30*b*.

A solution to the above problems is to create one or more custom global content directories 35 ("custom GCD"). In the embodiment shown in FIG. 1, there is only one custom GCD 35, but it should be understood that there may be more than one custom GCD 35 in system 10. Custom GCD 35 provides a directory of products using a directory structure in which products are organized using a hierarchical classification system to obtain product data (like GCD 42). But custom GCD 35 only provides access to particular seller databases 32. Unlike GCD 42, custom GCD 35 does not provide access to all seller databases 32 but only to select seller databases 32. When buyer 20 needs to search for a particular product but also has specific seller requirements, buyer 20 may provide seller requirements to help create custom GCD 35. GCD server 40 receives the seller requirements and determines which sellers 30 satisfy the seller requirements. Using only the sellers 30 that satisfy the seller requirements, GCD server 40 may create a custom GCD 35 providing access to product data from sellers 30 that satisfy the seller requirements. Buyer 20 may then use custom GCD 35 to formulate and execute product searches using only product criteria since the product data in seller databases 32 that is searched will have already satisfied buyer's 20 seller requirements. Therefore, the amount and time of searching by buyer 20 decreases using custom GCD 35 because buyer 20 only searches product data for sellers 30 that satisfy buyer's 20 seller requirements instead of searching all the product data and using product and seller search criteria to locate the desired products.

Figure 2:
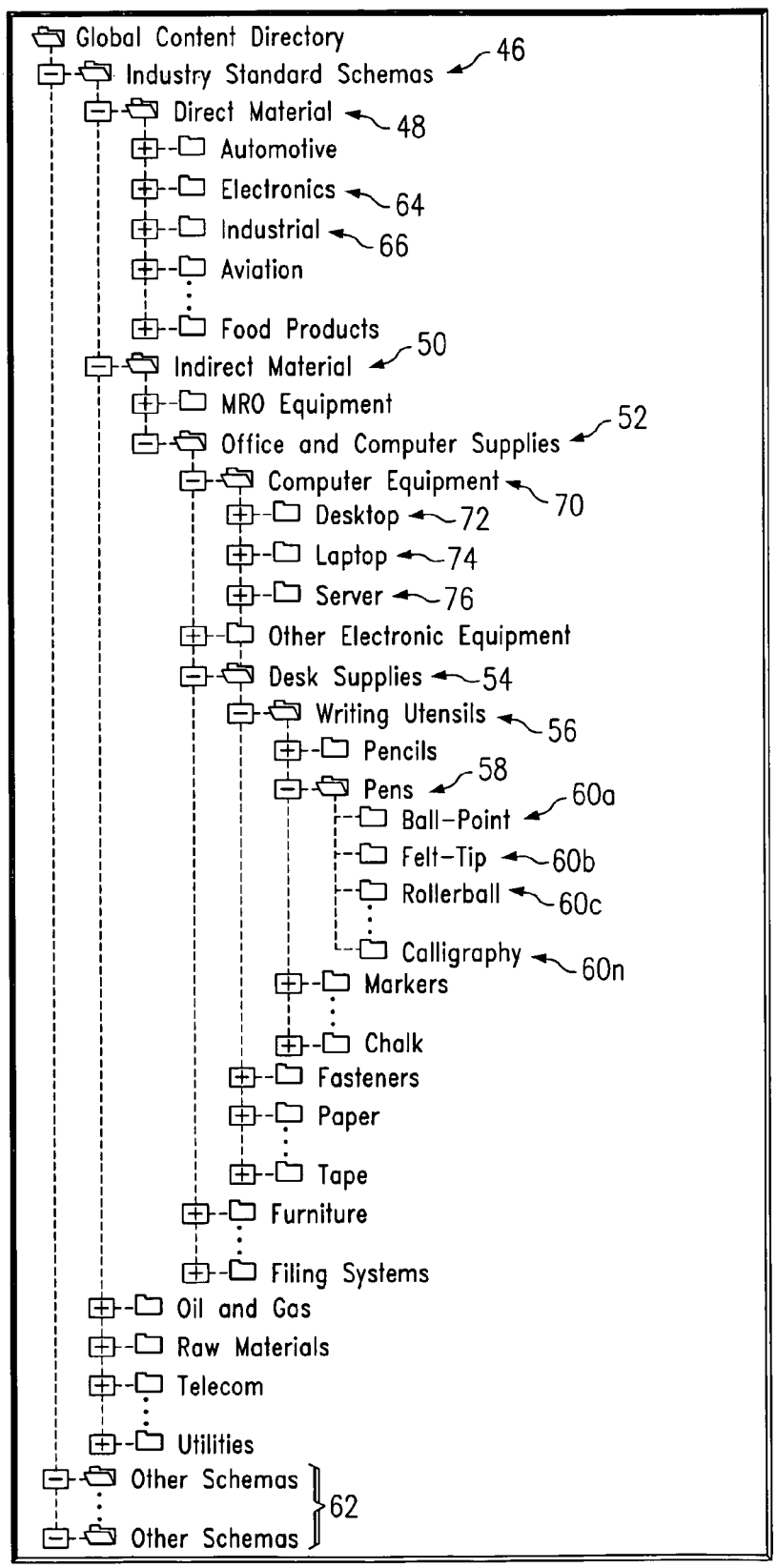
FIG. 2 illustrates an example directory structure of an example global content directory.

FIG. 2 illustrates an example directory structure 44 of an example custom GCD 35. The contents of directory structure 44 are customized for sellers 30 that satisfy a particular buyer's 20 seller requirements. For all sellers 30 there exists a set of attributes for each seller. Such attributes may include geographic restrictions (such as seller locations or served markets), currencies accepted by each seller, collaboration tools accepted by each seller, contract terms accepted by each seller, types of contracts accepted by each seller, levels of buyer credit required by each seller, and any other suitable seller attributes. Buyer 20 determines which seller requirements buyer 20 desires from sellers 30 and GCD server 40 receives these seller requirements from buyer 20 and correlates them with the seller attributes to determine which sellers 30 satisfy the seller requirements. GCD server 40 then creates custom GCD 35 to provide buyer 20 access to the products provided by the these sellers 30. For example, buyer 20 may be interested in sellers selling products that are measured in only metric units and with product data in the French. GCD server 40 uses these two seller requirements to search the seller attributes associated with multiple sellers 30 to find sellers 30 that have product data in French and sell products measured in metric units.

Products categorized in custom GCD 35 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes).

Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60*a*–60*n* ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60*b* form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from custom GCD 35.

A buyer 20 may navigate through directory structure 44 by expanding or collapsing various classes as desired. For example, FIG. 2 illustrates an expansion of certain classes of directory structure 44 to reach a felt-tip pen class 60*b*. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pens having medium tips. Alternatively, if buyer 20 navigates to the end of a branch of directory structure 44, such as felt-tip pen class 60*b*, custom GCD 35 may then enable buyer 20 to search for such pens that have blue ink and medium tips (which may reach the same result as the search above).

As described above, in one embodiment product data (at least product data more detailed than data provided by a taxonomy) and seller data are not stored in custom GCD 35, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data for products contained in that class or to identify particular data in databases 32 for sellers 30 that satisfy the seller requirements. Therefore, custom GCD 35 may execute a search for products in databases 32 identified by a pointer corresponding to a user-selected (or automatically selected) class. Custom GCD 35 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

Custom GCD 35 may be implemented using the lightweight directory access protocol (LDAP), which enables directories to be provided using the tree-like structure described above. However, any other appropriate technique or protocol for creating custom GCD 35 may alternatively be used and custom GCD 35 may have any appropriate structure. Furthermore, custom GCD 35 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60*b*, a search performed by buyer 20 (or by custom GCD 35 on behalf of buyer 20) from felt-tip pens class 60*b* may automatically be limited to a search for felt-tip pens from sellers satisfying the seller requirements and buyer 20 may introduce additional desired search criteria (such as blue ink and medium tip). Therefore, if a database 32 searched includes product data relating to a variety of writing utensils, a search of database 32 may be automatically limited by custom GCD 35 to only include felt-tip pens within that database 32. Buyer 20 may also identify additional product attribute values as additional search criteria.

When a search has been performed of the databases 32 for sellers 30 satisfying the seller requirements and identified by a pointer or pointers associated with a class that buyer 20 has selected (or that has been automatically selected), custom GCD 35 or associated components (such as GCD server 40) may return product data associated with one or more products matching the search criteria. Custom GCD 35 may integrate the product data resulting from the search into directory structure 44 so that the data appears to buyer 20 as being part of custom GCD 35. Custom GCD 35 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 enters specific seller requirements and GCD server 40 creates custom GCD 35 having pointers to product data from sellers 30 satisfying the seller requirements. Buyer 20 may search for a product matching certain product attribute values available from sellers 30 matching specific seller requirements using custom GCD 35. This allows buyer 20 to only search seller databases 32 of sellers 30 satisfying the seller requirements and eliminates or reduces the need for buyer 20 to search all seller databases 32 that are identified in one or more classes of GCD 42 to find the desired product available from a suitable seller. Custom GCD 35 provides access to product data relating to these numerous products from sellers 30 satisfying the seller requirements using directory structure 44, which organizes products using a hierarchical, object-oriented classification system. Buyer 20 may navigate or search directory structure 44 to find a particular classification of products and various information associated with the products within this classification, initiate a search of appropriate seller databases 32 including product data relating to a product, and then communicate with an appropriate database 32 through GCD server 40 or otherwise. Such access to vast numbers of products offered by sellers 30 satisfying seller requirements is provided without the requirement that all data about the products and/or sellers be stored in a global database and without the requirement that buyer 20 search all seller databases 32 including data about a particular product regardless of whether the associated seller meets the buyer's seller requirements. This is unlike GCD 42 which functions like custom GCD 35 but in which each class in GCD 42 includes pointers to databases 32 relevant to the class, but in which the pointers have not been customized to identify only seller databases 32 associated with sellers 30 meeting the seller requirements.

Figure 3:
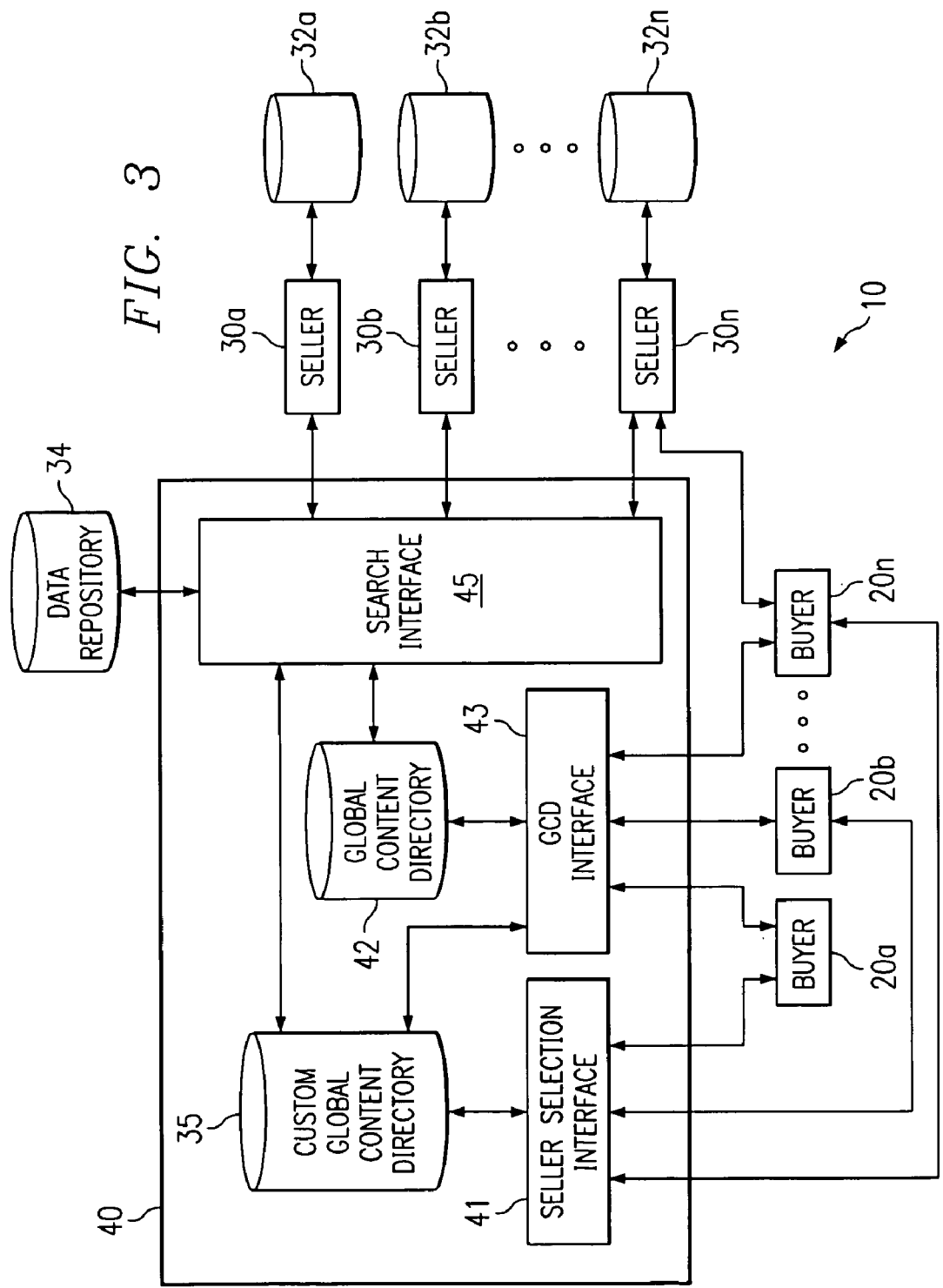
FIG. 3 illustrates an example electronic commerce system in further detail.

FIG. 3 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer may be allowed to perform a general search of databases 32 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want.

Based on search criteria provided by buyer 20 or automatically generated, search interface 45 may communicate a query to the appropriate seller database(s) 32 requesting that databases 32 each return a listing of all products (including associated product data and/or seller data) that meet the search criteria. Databases 32 may also return data relating to attribute values that were not included in the search criteria. For example, databases 32 may return a price and availability of products that meet the search criteria even if price and availability were not search criteria. The responses to the queries of databases 32 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive. Alternatively, the search results may be communicated directly to buyer 20 from databases 32.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20*n* and seller 30*n*) is shown to illustrate communication between buyers 20 and sellers 30, it should be understood that any buyer 20 may communicate with any seller 30 to conduct appropriate transactions.

In addition to using GCD 42 which includes pointers to seller databases 32, buyers 20 may also use system 10 to perform narrower searches for products when buyer 20 has specific seller requirements that must be satisfied and does not want to waste time searching seller databases 32 for sellers 30 that do not satisfy buyer's 20 seller requirements. Buyers 20 may create one or more custom GCD's 35 for this purpose.

As with GCD 42, GCD server 40 may provide buyers 20 with access to custom GCD 35 using a web server or in any other appropriate manner. Although custom GCD 35 is shown as being internal to GCD server 40, custom GCD 35 may be internal or external to GCD server 40 and there may be one or more custom GCD's 35, as described above. GCD server 40 also includes hardware and/or software for implementing seller selection interface 41. A buyer 20 may access server 40 and use seller selection interface 41 to enter specific seller requirements or enter in an access code to access a private GCD where buyer 20 and seller 30 have a previous transaction relationship or an agreement by seller 30 to provide special prices to buyer 20, as described in further detail below.

In an example transaction, buyer 20*a* may access seller selection interface 41 and enter buyer's 20*a* seller requirements. For example, if buyer 20*a* is located in the United States and is interested in computers for use in the United States and Canada, buyer 20*a* may desire sellers 30 that have a seller database 32 in English, that sell products that operate on 110 volts, and that sell to buyers in the United States. So in seller selection interface 41, buyer 20*a* will enter these specific seller requirements. Seller selection interface 41 and GCD server 40 take these seller requirements and search seller attributes stored in seller databases 32 and any other data storage location to locate sellers 30 that satisfy all these seller requirements. When sellers 30 are located that satisfy the seller requirements, GCD server 40 creates custom GCD 35 as described above. The arrangement and directory structure of custom GCD 35 is the same as GCD 42 except that the associated pointers in the product classes for custom GCD 35 only identify product data in seller databases 32 for the sellers 30 that satisfy the seller requirements.

Once GCD server 40 creates custom GCD 35 based on sellers 30 that satisfy the seller requirements, buyer 20*a* may access, navigate, and search custom GCD 35 using GCD interface 43. As described above with reference to GCD 42, GCD interface 43 may allow buyer 20*a* to both navigate or "browse" the classes of custom GCD 35 and to search for a particular class or classes. For example, buyer 20*a* may either navigate custom GCD 35 to find a class into which computers are categorized or buyer 20*a* may search custom GCD 35 for class names including the word "computer." Any other suitable methods for identifying a particular class may also be used. When buyer 20*a* has located the appropriate class for the product buyer 20*a* desires, buyer 20 may then request a listing of products in that class matching certain product attribute values. The list of products that buyer 20*a* receives will only be from sellers 30 who satisfy buyer's 20*a* seller requirements. So for example, if buyer 20*a* is interested in laptop computers having 14 inch screens, buyer 20*a* will be able to view all the laptops having 14 inch screens within laptop class 74 from sellers 30 that service the United States and Canada, have seller databases 32 in English and whose products operate on 110 volts.

Search interface 45, or any other appropriate component of GCD server 40, may facilitate such a request by searching or requesting searches of seller databases 32 identified by one or more pointers associated with laptop class 74, as described above. But since the search is performed within custom GCD 35, the pointers only identify product data from sellers 30 that satisfy the seller requirements. Search interface 45 may provide buyer 20*a* a search form in which to enter one or more search criteria. The types of search criteria that may be used may be identified in the search form or buyer 20*a* may be allowed to perform a general search of databases 32 for sellers 30 satisfying seller requirements for certain terms. For example, search interface 45 may provide buyer 20 with a search form tailored for class 74 that includes fields where buyer 20 can specify a desired screen size, weight, or any other appropriate product-related or seller-related criteria. In addition, buyer 20*a* can use search interface 45 to add further seller requirements and further narrow down the seller pool. In one embodiment, the fields of the search form correspond to some or all of the product attributes within the product ontology corresponding to the product class that has been selected, and buyer 20*a* may enter values for the product attributes in the corresponding search form fields. In lieu of a search form, search interface 45 may instead provide a single field where buyer can enter in desired search terms, such as "laptop" and "CD-ROM" (multiple search terms may be entered using Boolean operators or any other appropriate technique).

Search interface 45, or any other appropriate component of GCD server 40, may also provide the same functions and services for custom GCD 35 as described above with respect to GCD 42 such as facilitating search requests by accessing a buyer profile for buyer 20, as described above. For example, buyer 20 may always have the same seller requirements regardless of the product buyer 20 is searching for. Therefore, GCD server 40 will store these seller requirements so that whenever buyer 20 performs a search using custom GCD 35, buyer 20 will always search only the product data for sellers 30 satisfying the seller requirements. In one embodiment, search interface 45 may access the profile for buyer 20 to automatically enter the seller requirements into seller selection interface 41 and generate custom GCD 35.

Buyer 20 may select a product from a product listing to indicate a desire to initiate a transaction regarding the product, such as a purchase of the product. On such a selection, custom GCD 35 may communicate a RID identifying the selected seller 30 and a GUID for the product to buyer 20. For example, an RID may be the network address (such as an IP address) of a seller network node 30 or may be associated with the network address in a table (in which case custom GCD 35 may use the RID to look up the associated network address and then communicate the network address to buyer 20). Buyer 20 may access the seller 30 using the RID (or network address) and request a transaction regarding the product using the GUID. Custom GCD 35 may even provide a link including a URL of a web site associated with the seller 30 or may provide another appropriate method for buyer 20 to be connected to seller 20. Although only a single example arrow (between buyer 20*n* and seller 30*n*) is shown to illustrate communication between buyers 20 and sellers 30, it should be understood that any buyer 20 may communicate with any seller 30 to conduct appropriate transactions.

Seller selection interface 41 may also provide additional ways to create custom GCD's 35 besides buyer 20 entering seller requirements. In addition to receiving seller requirements from buyer 20, seller selection interface 41 may also take advantage of special agreements or arrangements between buyers 20 and sellers 30 to allow for custom or private GCD's. A private GCD is a custom GCD that is created for access by one or a small number of buyers 20 based on a previous transaction relationship or agreement with a particular seller 30. For example, buyer 20*b* and seller 20*b* may decide to enter into an exclusive agreement where buyer 20*b* agrees to buy all of buyer's 20*b* pen requirements from seller 30*b*. In return for buyer 20*b* agreeing to buy exclusively from seller 30*b*, seller 30*b* offers a discounted price for the pens. Seller 30*b* would like to make the product data for the pens including the discounted prices available to buyer 20*b* at all times but seller 30*b* does not want other buyers 20 to be able to see the discounted prices that seller 30*b* makes available to buyer 20*b*. Therefore, seller 30*b* might create a separate product database that is only accessible to buyer 20*b*. But the cost and time involved in duplicating all the product data and creating a separate database for buyer 20*b* may not be worth the money seller 30*b* will make in its arrangement with buyer 20*b*. Therefore, seller 30*b* would like to continue to only have a single seller database 32 containing all of seller's 30*b* product data but have certain product attributes made available only to buyer 20*b*. Seller 30*b* may accomplish this through the use of the seller selection interface 41 and custom GCD 35. When buyer 20*b* uses system 10 to search for and purchase pens from seller 30*b*, buyer 20*b* will access seller selection interface 41. But instead of entering seller requirements into seller selection interface 41, buyer 20*b* may enter a password or access code that indicates to seller selection interface 41 and GCD server 40 that buyer 20*b* has permission to view private areas of seller's 30*b* product data and therefore should be granted access to seller's 30*b* discounted products via the product data stored in seller database 32. Therefore, GCD server 40 creates custom GCD 35 using pointers that identify the product data for the pens having the discounted prices from seller 30*b*. Buyer 20*b* can then navigate and search the directory structure of custom GCD 35 to locate the pens needed by buyer 20*b*, contact seller 30*b* and complete a transaction for pens. A seller 30 may have as many private GCD's as seller 30 has agreements with different buyers 20 or have only one private GCD accessible by all buyers 20 that have a previous transaction relationship with the seller 30.

Seller selection interface 41 may also support multi-language support in the creation of custom GCD 35. The multi-language support function may be set up to be always on, be always off or allow buyers 20 to activate it on or off. Multi-language support allows GCD server 40 to create a custom GCD 35 based upon the geographic location of buyer 20. If multi-language support is activated, when buyer 20 accesses seller selection interface 41, seller selection interface 41 determines the geographic location of buyer 20. Once seller selection interface 41 determines the geographic location of buyer 20, seller selection interface 41 determines which languages correspond with that geographic location. Buyer 20 always has the option to just specify a desired language but multi-language support allows a language selection to be made without any action by buyer 20. Using the languages corresponding to the geographic location of buyer 20 or specified by buyer 20, GCD server 40 and seller selection interface 41 may create custom GCD 35 using only sellers 30 whose seller databases 32 are in the languages corresponding to buyer's 20 geographic location. Buyer 20 may also have the option of entering into seller selection interface 41 additional seller requirements so that custom GCD 35 will then have product data only for sellers 30 whose seller databases 32 are in the languages corresponding to the geographic location of buyer 20 and also satisfy the seller requirements. For instance, if buyer 20*a* is located in Germany, seller selection interface 41 determines that German is the language that corresponds with the geographic location of buyer 20*a*. Depending on how multi-language support is set up, GCD server 40 and seller selection interface 41 would create custom GCD 35 using only sellers 30 whose seller databases 32 are in German or buyer 20 would be allowed to enter in seller selection interface 41 additional seller requirements and then GCD server 40 would create custom GCD 35 containing product data for sellers 30 whose seller databases 32 are in German and also meet all the additional seller requirements. Multi-language support may also be set up to automatically activate when buyer 20 accesses system 10 whereby buyer 20*a* would be presented with a custom GCD 35 for sellers 30 whose seller databases 32 are in German and buyer 20*a* would not know that custom GCD 35 was created specifically for buyer 20*a* based on the geographic location of buyer 20*a*.

In addition, although particular types of customizations of GCD's have been described, any appropriate criteria may be used to generate custom GCD 35. The criteria may include, but is not limited to, seller requirements or product requirements. Seller requirements allow buyer 20 to create a custom GCD 35 limiting the product data to sellers 30 offering the desired product data that satisfy the seller requirements. Product requirements allow buyer 20 to create custom GCD 35 limiting the product data to products from various sellers 30 where the product data satisfies the product requirements specified by buyer 20.

Figure 4B:
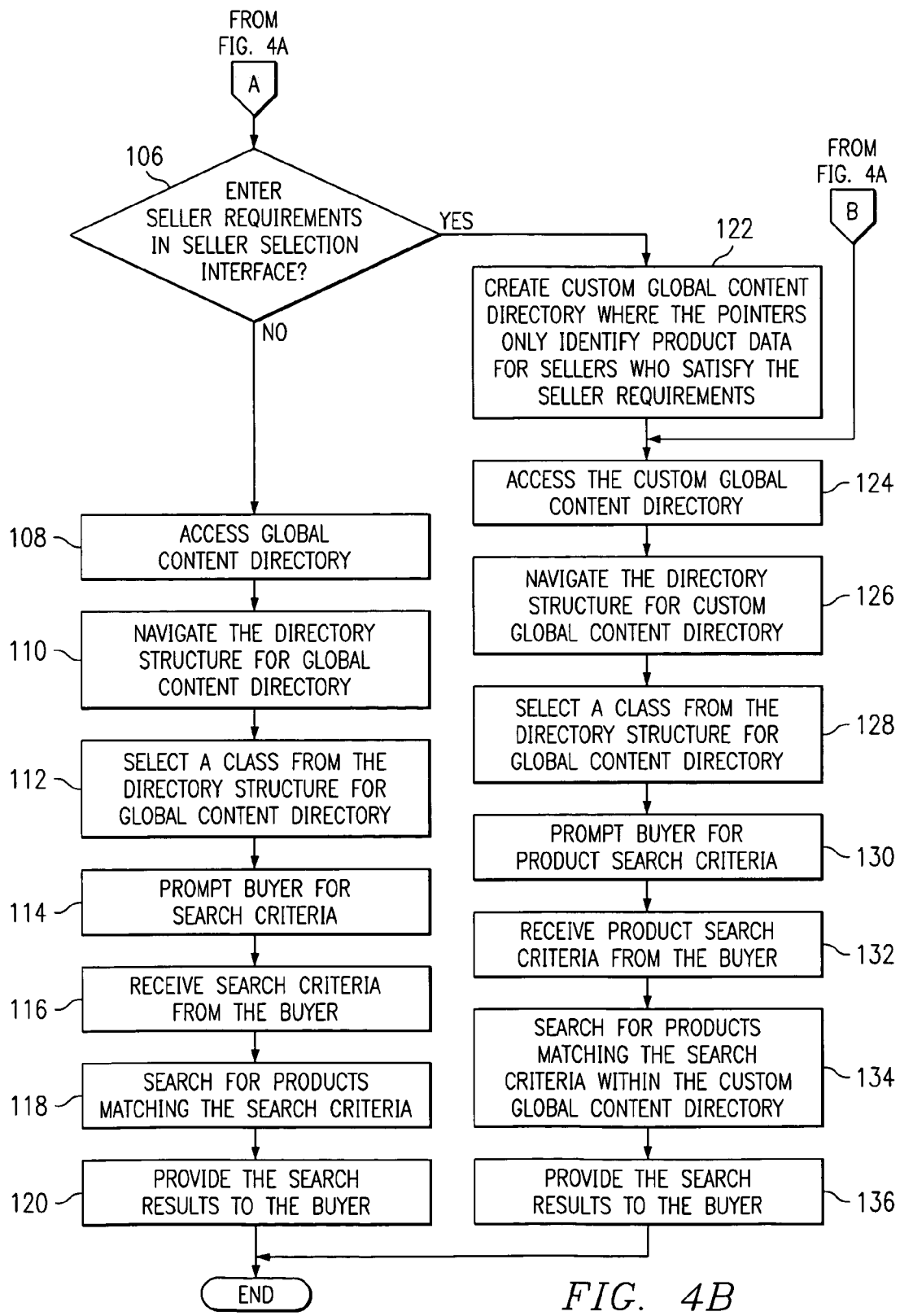
FIG. 4 illustrates an example method for searching product data using dynamic database redirection.

FIG. 4 illustrates an example method for searching product data using dynamic database redirection using custom GCD 35. Dynamic database redirection involves the redirecting of the pointers associated with the product classes to particular product data satisfying a buyer's 20 specific seller and/or product requirements. The method begins at step 102, when buyer 20 accesses e-commerce transaction system 10 in order to initiate an e-commerce transaction. At step 104, GCD server 40 and seller selection interface 41 determine whether to apply multi-language support. If multi-language support is not applied, buyer 20 still has the option of including language as a seller requirement. The decision to apply multi-language support depends on how a system administrator of the e-commerce transaction system sets up the system. The multi-language support may automatically activate whenever buyer 20 accesses the e-commerce transaction system, buyer 20 may be able to turn on or off the multi-language support, or there may be any other appropriate configuration. If at step 104 multi-language support does not apply, then at step 106 buyer 20 has the option to enter in one or more seller requirements into seller selection interface 41.

If at step 106 buyer 20 decides to not enter any seller requirements, then GCD server 40 will not create custom GCD 35 and buyer 20 will search for products and sellers 30 using GCD 42 and thereby search the product data stored in all of the seller databases 32. When buyer 20 does not enter any seller requirements or uses a previously created custom GCD 35, buyer 20 accesses GCD 42 using GCD interface 43 at step 108. As described above, buyers 20 may access GCD 42 using a web browser or in any other appropriate manner. Buyer 20 navigates the directory structure of GCD 42 at step 110 to a class that is specific enough for buyer 20 (and/or a class that is at the end of a branch), as described above. At step 112, buyer 20 selects the class. Buyer 20 may also request a search of a product class appearing in a "frequently searched product classes" list that may be maintained for the convenience of buyer 20 without having to navigate a list of classes. Such a list may be stored in a buyer profile, described above, or elsewhere by GCD server 40 or another computer accessible to buyer 20. As an alternative to steps 110 and 112, a class may be automatically selected based on a buyer profile. When a class has been selected, buyer 20 is prompted at step 114 to enter search criteria. For example, as described above, server 40 may provide buyer 20 a search form in which to enter one or more search criteria or a single field where buyer 20 may enter desired criteria, and the fields of the search form may correspond to some or all of the product attributes within the product ontology and/or seller attributes within the seller ontology corresponding to the product class that has been selected. Such criteria may include product attribute values, seller attribute values, or a combination of product attribute values and seller attribute values.

At step 116, buyer 20 provides desired search criteria. Alternatively, GCD server 40 may automatically generate some or all of the search criteria. Using the search criteria provided by buyer 20 or otherwise generated, search interface 45 searches, at step 118, for products matching the search criteria in seller databases 32 containing product data associated with products within the class selected by buyer 20. Search interface 45 may perform the search in any appropriate manner. At step 120, server 40 presents one or more products matching (or partially matching) the search criteria to buyer 20, and the method ends. Alternatively, the results of the search query may be communicated directly from seller database(s) 32 to buyer 20.

If at step 106 buyer 20 decides to enter seller requirements to create custom GCD 35 (or decides to use a previously created custom GCD 35), then buyer 20 enters one or more seller requirements into seller selection interface 41 or selects an existing custom GCD 35. If buyer 20 enters seller requirements, seller selection interface 41 and GCD server 40 take the seller requirements and search the seller attribute data in seller databases 32 to create custom GCD 35 at step 122. Custom GCD 35 includes pointers that identify product data in seller databases 32 from sellers 30 that satisfy all of the seller requirements. As described above, custom GCD 35 allows buyer 20 to search only product data from sellers 30 satisfying the seller requirements instead of having to search all the product data and narrowing the search using product criteria and seller criteria.

Once GCD server 40 creates custom GCD 35 or identifies an existing custom GCD 35, at step 124 buyer 20 accesses custom GCD 35 using GCD interface 43. As described above, buyers 20 may access custom GCD 35 using a web browser or in any other appropriate manner. Buyer 20 navigates the directory structure of custom GCD 35 at step 126 to a class that is specific enough for buyer 20 (and/or a class that is at the end of a branch), as described above. At step 128, buyer 20 selects the class. As described above in relation to GCD 42, buyer 20 may also take advantage of the special features of GCD server 40 including frequently searched product classes lists, a buyer profile, and automatic class selection in relation to custom GCD 35.

When a class has been selected, buyer 20 is prompted at step 130 to enter product search criteria. At this step, buyer 20 does not need to enter any seller search criteria because custom GCD 35 only points to product data for sellers 30 satisfying the seller requirements. If buyer 20 desired to further narrow the seller pool, buyer 20 may enter additional seller search criteria but the quick and efficient searching capabilities of custom GCD 35.

At step 132, buyer 20 provides desired product and/or seller search criteria using GCD interface 43. Using the search criteria provided by buyer 20 or otherwise generated, at step 134 search interface 45 searches for products matching the product search criteria in appropriate seller databases 32 identified within the class selected by buyer 20. Search interface 45 may perform the search in any appropriate manner, as described above with regards to GCD 42 except with respect to custom GCD 35 the pointers only identify product data from sellers 30 satisfying the seller requirements. At step 136, GCD server 40 presents one or more products matching (or partially matching) the product search criteria to buyer 20, and the method ends. Alternatively, the results of the search query may be communicated directly from seller database(s) 32 to buyer 20. When buyer 20 uses custom GCD 35 instead of GCD 42, buyer 20 only searches the product data from sellers satisfying the seller requirements instead of searching product data associated with other sellers. Therefore, a search using custom GCD 35 is quicker and more efficient because less time is spend searching product data from sellers 30 with whom buyer 20 is not interested in transacting.

If at step 104 multi-language support does apply, then at step 138 seller selection interface 41 determines the geographic location of buyer 20. Seller selection interface 41 may determine the geographic location of buyer 20 by examining the IP address that buyer 20 uses to access e-commerce transaction system 10. Once seller selection interface 41 determines the geographic location of buyer 20, at step 140 seller selection interface 41 determines the languages the correspond with the geographic location of buyer 20. At step 142, buyer 20 has the option of entering additional seller requirements into seller selection interface 41. If buyer 20 does enter additional seller requirements at step 142, then at step 144 GCD server 40 creates custom GCD 35 where custom GCD 35 includes pointers that identify product data from sellers 30 that satisfy all of the seller requirements and have seller databases 32 in the languages corresponding to the geographic location of buyer 20. Once GCD server 40 creates custom GCD 35 at step 144, buyer 20 accesses custom GCD 35 at step 124, performs steps 126 through 136 as described above and the method ends. If at step 142 buyer 20 decides to not enter additional seller requirements or does not have the option to enter additional seller requirements, then at step 146 GCD server 40 creates custom GCD 35 where custom GCD 35 includes pointers to product data from sellers 30 who seller databases 32 are in the languages corresponding to the geographic location of buyer 20. Once GCD server 40 creates custom GCD 35 at step 146, buyer 20 accesses custom GCD 35 at step 124, performs steps 126 through 136, and the method ends.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system applying dynamic database redirection, the system comprising:
   one or more seller databases including product data for one or more products;
   a global content directory server coupled to the one or more seller databases, the global content directory server comprising:
      a seller selection module configured to receive one or more seller requirements from one or more buyers coupled to the global content directory server;
      one or more custom global content directories generated by the global content directory server based on the one or more seller requirements received from the one or more buyers, each of the one or more custom global content directories includes a plurality of product classes organized in a hierarchy, each product class categorizing a plurality of products from one or more sellers satisfying the one or more seller requirements received from the one or more buyers and each product class associated with one or more attributes of the products categorized in the product class, at least one of the product classes having one or more associated pointers that identify one or more seller databases associated with sellers satisfying the one or more seller requirements received from the one or more buyers; and
      a search module configured to communicate a search query to the one or more seller databases to search the product data stored in the one or more seller databases identified by one of the pointers.

2. The system of claim 1, further operable to:
   receive one or more product requirements from one or more buyers coupled to the global content directory server; and
   generate one or more custom global content directories based on the one or more product requirements received from the one or more buyers.

3. The system of claim 2, further operable to:
   determine a geographic location for the one or more buyers and one or more languages that correspond to the geographic location of the one or more buyers; and
   generate custom global content directories where the pointers identify seller databases in the languages corresponding to the geographic location of the one or more buyers.

4. The system of claim 1, wherein one or more of the pointers identify particular product data in one or more of the seller databases where the product data is associated with sellers satisfying the one or more seller requirements received from the one or more buyers.

5. The system of claim 1, wherein the search query comprises desired values, specified by the one or more buyers, for one or more of the product attributes associated with the selected product class.

6. The system of claim 1, wherein the search module is further configured to:
   receive search results from one or more of the seller databases in response to the search query, the search results including product data associated with one or more products satisfying the search query and from sellers satisfying the one or more seller requirements received from the one or more buyers; and
   communicate the search results to the one or more buyers.

7. The system of claim 6, wherein the one or more custom global content directories are further operable to:
   receive a selection from the one or more buyers of a product for which product data is included in the search results; and
   communicate address information associated with a seller database that includes product data for the selected product, the address information enabling the one or more buyers to communicate with a seller associated with the seller database who satisfy the one or more seller requirements received from the one or more buyers to conduct a commerce transaction relating to the selected product.

8. The system of claim 1, wherein the one or more custom global content directories comprise one or more private global content directories containing product classes having one or more associated pointers that identify product data only available to one or more buyers associated with the private global content directory.

9. The system of claim 8, wherein the seller selection module is further configured to receive an access code from the one or more buyers, the access code operable to allow the one or more buyers to search the product data associated with the private global content directories.

10. A method for dynamic database redirection in an electronic commerce transaction, the method comprising:
    receiving one or more seller requirements from one or more buyers;
    creating one or more custom global content directories by a global content directory server, based on the one or more seller requirements received from the one or more buyers, the custom global content directory comprising a directory structure including a plurality of product classes organized in a hierarchy, each product class categorizing a plurality of products from one or more sellers satisfying the one or more seller requirements received from the one or more buyers and each product class associated with one or more attributes of the products categorized in the product class, one or more of the product classes having one or more associated pointers that identify one or more seller databases associated with sellers satisfying the one or more seller requirements received from the one or more buyers;
    receiving a selection of a product class from the one or more buyers, the product class having a pointer identifying one or more of the seller databases;
    in response to the selection of the product class by the one or more buyers, communicating a search query to the one or more seller databases to search the product data.

11. The method of claim 10, wherein one or more of the pointers identify particular product data in one or more of the seller databases where the product data is for sellers satisfying the one or more seller requirements received from the one or more buyers.

12. The method of claim 10, further comprising:
receiving one or more product requirements from one or more buyers coupled to the global content directory server; and
generating one or more custom global content directories based on the one or more product requirements received from the one or more buyers.

13. The method of claim 10, wherein creating the custom global content directory comprises associating the product classes with product data for one or more sellers satisfying the one or more seller requirements received from the one or more buyers.

14. The method of claim 10, further comprising providing multi-language support based upon the geographic location of the one or more buyers.

15. The method of claim 14, wherein providing multi-language support comprises:
determining a geographic location for the one or more buyers;
determining one or more languages that correspond to the geographic location of the one or more buyers; and
creating the custom global content directory using the seller requirements received from the one or more buyers and the one or more languages corresponding to the geographic location of the one or more buyers.

16. The method of claim 10, wherein communicating a search query to the one or more seller databases comprises communicating the search query to the one or more seller databases associated with the sellers that satisfy the one or more seller requirements received from the one or more buyers.

17. The method of claim 10, further comprising:
receiving search results from one or more of the seller databases in response to the search query, the search results including product data associated with one or more products satisfying the search query from the sellers satisfying the one or more seller requirements received from the one or more buyers; and
communicating the search results to the one or more buyers.

18. The method of claim 17, further comprising:
receiving a selection from the one or more buyers of a product for which product data is included in the search results; and
communicating address information associated with a seller database that includes product data for the selected product, the address information enabling the one or more buyers to communicate with a seller associated with the seller database to conduct a commerce transaction relating to the selected product.

19. The method of claim 10, wherein creating one or more custom global content directories based on the seller requirements received from the one or more buyers comprises creating one or more private global content directories containing product classes having one or more associated pointers that identify product data only available to one or more buyers associated with the private global content directory.

20. The method of claim 19, further comprising receiving an access code from the one or more buyers, the access code operable to allow the one or more buyers to access a private global content directory.

21. Software for dynamic database redirection in an electronic commerce transaction, the software embodied in a computer-readable medium and operable to:
receive one or more seller requirements from one or more buyers;
create one or more custom global content directories by a global content directory server, based on the seller requirements received from the one or more buyers, the custom global content directory comprising a directory structure including a plurality of product classes organized in a hierarchy, each product class categorizing a plurality of products from one or more sellers satisfying the one or more seller requirements received from the one or more buyers and each product class associated with one or more attributes of the products categorized in the product class, one or more of the product classes having one or more associated pointers that identify a one or more seller databases associated with sellers satisfying the one or more seller requirements received from the one or more buyers;
receive a selection of a product class from the one or more buyers, the product class having a pointer identifying one or more of the seller databases;
in response to the selection of the product class by the one or more buyers, communicate a search query to the one or more seller databases to search the product data.

22. The software of claim 21, wherein one or more of the pointers identify particular product data in one or more of the seller databases where the product data is for sellers satisfying the one or more seller requirements received from the one or more buyers.

23. The software of claim 21, further operable to:
receive one or more product requirements from one or more buyers coupled to the global content directory server; and
generate one or more custom global content directories based on the one or more product requirements received from the one or more buyers.

24. The software of claim 21, wherein creating the custom global content directory comprises associating the product classes with product data for one or more, sellers satisfying the seller requirements received from the one or more buyers.

25. The software of claim 21, further operable to provide multi-language support based upon the geographic location of the one or more buyers.

26. The software of claim 25, wherein providing multi-language support comprises:
determining a geographic location for the one or more buyers;
determining one or more languages that correspond to the geographic location of the one or more buyers; and
creating the custom global content directory using the seller requirements received from the one or more buyers and the one or more languages corresponding to the geographic location of the one or more buyers.

27. The software of claim 21, wherein communicating a search query to the one or more seller databases comprises communicating the search query to one or more the seller databases associated with the sellers that satisfy the one or more seller requirements received from the one or more buyers.

28. The software of claim 21, further operable to:
receive search results from one or more of the seller databases in response to the search query, the search results including product data associated with one or more products satisfying the search query from the sellers satisfying the one or more seller requirements received from the one or more buyers; and
communicate the search results to the one or more buyers.

29. The software of claim 28, further operable to:
receive a selection from the one or more buyers of a product for which product data is included in the search results; and
communicate address information associated with a seller database that includes product data for the selected product, the address information enabling the one or more buyers to communicate with a seller associated with the seller database to conduct a commerce transaction relating to the selected product.

30. The software of claim 21, wherein creating one or more custom global content directories based on the seller requirements received from the one or more buyers comprises creating one or more private global content directories containing product classes having one or more associated pointers that identify product data only available to one or more buyers associated with the private global content directory.

31. The software of claim 30, further operable to receive an access code from the one or more buyers, the access code operable to allow the one or more buyers to access a private global content directory.

32. A system for dynamic database redirection in an electronic commerce transaction, the method comprising:
means for receiving one or more seller requirements from one or more buyers;
means for creating one or more custom global content directories based on the seller requirements received from the one or more buyers, the custom global content directory comprising a directory structure including a plurality of product classes organized in a hierarchy, each product class categorizing a plurality of products from one or more sellers satisfying the one or more seller requirements received from the one or more buyers and each product class associated with one or more attributes of the products categorized in the product class, one or more of the product classes having one or more associated pointers that identify a one or more seller databases associated with sellers satisfying the one or more seller requirements received from the one or more buyers;
means for receiving a selection of a product class from the one or more buyers, the product class having a pointer identifying one or more of the seller databases;
means for communicating a search query to the seller databases to search the product data, in response to the selection of the product class by the one or more buyers.

* * * * *